United States Patent [19]

Hartsell, Jr. et al.

[11] Patent Number: 5,956,259

[45] Date of Patent: Sep. 21, 1999

[54] INTELLIGENT FUELING

[75] Inventors: Hal C. Hartsell, Jr., Kernersville; Edward A. Payne, Greensboro, both of N.C.

[73] Assignee: Gilbarco Inc., Greensboro, N.C.

[21] Appl. No.: 08/759,733

[22] Filed: Dec. 6, 1996

Related U.S. Application Data

[60] Provisional application No. 60/009,125, Dec. 8, 1995.

[51] Int. Cl.[6] ..................................................... G06F 19/00
[52] U.S. Cl. ................ 364/528.37; 702/150; 364/528.17
[58] Field of Search .............................. 364/510, 424.01, 364/479.01, 479.11, 559, 528.37, 528.17; 141/1, 94, 98, 192, 198; 222/23, 52; 702/150, 152

[56] References Cited

U.S. PATENT DOCUMENTS

| | | | |
|---|---|---|---|
| 3,536,109 | 10/1970 | Ginsburgh et al. | 141/98 |
| 3,642,036 | 2/1972 | Ginsburgh et al. | 141/94 |
| 3,650,303 | 3/1972 | Chambers et al. | 141/1 |
| 3,662,924 | 5/1972 | Crandall et al. | 222/64 |
| 3,786,421 | 1/1974 | Wostl et al. | 340/149 |
| 3,814,148 | 6/1974 | Wostl | 141/98 |

(List continued on next page.)

FOREIGN PATENT DOCUMENTS

| | | |
|---|---|---|
| 2 502 134 | 3/1981 | France . |
| 2 600 318 | 12/1987 | France . |
| 4215872 A1 | 10/1993 | Germany . |
| 102768/2 | 8/1992 | Israel . |
| 62-297971 | 6/1986 | Japan . |
| 4-23695 | 5/1990 | Japan . |
| 4-78741 | 7/1990 | Japan . |
| 4-128186 | 4/1992 | Japan . |
| 6-227597 | 8/1994 | Japan . |
| 944327 | 3/1993 | South Africa . |
| 2 222 714 | 3/1990 | United Kingdom . |
| WO 94/05592 | 3/1994 | WIPO . |
| WO 94/06031 | 3/1994 | WIPO . |
| WO 95/14612 | 6/1995 | WIPO . |
| WO 95/32919 | 12/1995 | WIPO . |
| WO 96/28791 | 9/1996 | WIPO . |
| WO 96/39351 | 12/1996 | WIPO . |

OTHER PUBLICATIONS

Estimated Hydrocarbon Emissions of Phase II and Onboard Vapor Recovery Systems; State of California–California Environmental Protection Agency, Apr. 13, 1994.

Staff's Proposed Recommendation For The Adoption Of the United States Environmental Protection Agency's Vehicle Refueling Standard And Test Procedures; State of California Air Resources Board May 27, 1994.

SAE ORVR Task Force Committee Meeting Notice; Feb. 4, 1997.

SAE Meeting Notice; May 8, 1997.

SAE ORVR Task Force Meeting Notice; May 29, 1997.

*Primary Examiner*—Melanie A. Kemper
*Attorney, Agent, or Firm*—Rhodes Coats & Bennett, L.L.P.

[57] ABSTRACT

The present invention provides a fuel dispenser system capable of receiving a signal from a vehicle transponder. Upon receiving the transponder's signal, the dispenser determines the proximity of the vehicle relative to the dispenser, and preferably, a particular fueling position associated with that dispenser. Proximity is determined by measuring one or more characteristics of the signal received at an antenna associated with the dispenser. Generally, the strength or magnitude of the signal received at the antenna is the characteristic used to determine vehicle proximity. Multiple directionally sensitive antennas are used to correlate a vehicle at a unique fueling position. The controller is configured to receive a signal from the transponder indicative of the presence of an ORVR system on the vehicle. Depending on the sophistication of the communication link between the transponder and dispenser, the dispenser will control its vapor recovery system accordingly. If an ORVR equipped vehicle is detected, the dispenser may deactivate the dispenser's vapor recovery system or modify the vapor recovery system performance to maximize vapor recovery or retrieve a sufficient amount of air to reduce breathing of the underground storage tank.

106 Claims, 8 Drawing Sheets

U.S. PATENT DOCUMENTS

| | | | |
|---|---|---|---|
| 4,263,945 | 4/1981 | Van Ness | 141/98 |
| 4,313,168 | 1/1982 | Stephens et al. | 364/465 |
| 4,345,146 | 8/1982 | Story et al. | 235/381 |
| 4,469,149 | 9/1984 | Walkey et al. | 141/94 |
| 4,490,798 | 12/1984 | Franks et al. | 364/550 |
| 4,532,511 | 7/1985 | Lemelson | 340/933 |
| 4,600,829 | 7/1986 | Walton | 235/439 |
| 4,714,925 | 12/1987 | Bartlett | 340/825.5 |
| 4,728,955 | 3/1988 | Hane | 342/140 |
| 4,760,533 | 7/1988 | Bydlon | 364/465 |
| 4,846,233 | 7/1989 | Fockens | 141/94 |
| 4,881,581 | 11/1989 | Hollerback | 141/113 |
| 4,887,578 | 12/1989 | Woodcock et al. | 123/519 |
| 4,897,642 | 1/1990 | DiLullo et al. | 340/825 |
| 4,934,419 | 6/1990 | Lamont et al. | 141/94 |
| 4,967,366 | 10/1990 | Kaehler | 364/479 |
| 5,025,253 | 6/1991 | DiLullo et al. | 340/825 |
| 5,058,044 | 10/1991 | Stewart et al. | 364/551 |
| 5,070,328 | 12/1991 | Fockens | 340/825 |
| 5,072,380 | 12/1991 | Randelman et al. | 364/406 |
| 5,086,389 | 2/1992 | Hassett et al. | 364/401 |
| 5,131,441 | 7/1992 | Simpson et al. | 141/209 |
| 5,156,198 | 10/1992 | Hall | 141/94 |
| 5,184,309 | 2/1993 | Simpson et al. | 364/510 |
| 5,204,512 | 4/1993 | Ieki et al. | 235/382 |
| 5,204,819 | 4/1993 | Ryan | 364/465 |
| 5,217,051 | 6/1993 | Simpson et al. | 141/59 |
| 5,238,034 | 8/1993 | Corfitsen | 141/94 |
| 5,249,612 | 10/1993 | Parks et al. | 141/219 |
| 5,249,707 | 10/1993 | Simpson et al. | 222/40 |
| 5,267,592 | 12/1993 | Kaplan et al. | 141/387 |
| 5,327,066 | 7/1994 | Smith | 320/2 |
| 5,327,945 | 7/1994 | Simpson et al. | 141/59 |
| 5,343,906 | 9/1994 | Tibbals, III | 141/83 |
| 5,359,522 | 10/1994 | Ryan | 364/465 |
| 5,363,889 | 11/1994 | Simpson et al. | 141/208 |
| 5,365,984 | 11/1994 | Simpson et al. | 141/387 |
| 5,383,500 | 1/1995 | Dwars et al. | 141/98 |
| 5,392,049 | 2/1995 | Gunnarsson | 342/42 |
| 5,393,195 | 2/1995 | Corfitsen | 414/749 |
| 5,414,427 | 5/1995 | Gunnarsson | 342/51 |
| 5,422,624 | 6/1995 | Smith | 340/438 |
| 5,444,742 | 8/1995 | Grabow et al. | 375/267 |
| 5,485,520 | 1/1996 | Chaum et al. | 380/24 |
| 5,495,250 | 2/1996 | Ghaem et al. | 342/51 |
| 5,505,234 | 4/1996 | Simpson et al. | 141/206 |
| 5,541,835 | 7/1996 | Dextraze et al. | 364/401 |
| 5,552,789 | 9/1996 | Schuermann | 342/42 |
| 5,557,268 | 9/1996 | Hughes et al. | 340/933 |
| 5,562,133 | 10/1996 | Mitchell | 141/206 |
| 5,605,182 | 2/1997 | Oberrecht et al. | 141/94 |

INTELLIGENT FUELING

BACKGROUND OF THE INVENTION

This application claims the benefit of U.S. Provisional Application No. 60/009,125, filed Dec. 8, 1995. The Provisional Application is incorporated herein by reference.

The present invention relates generally to fuel dispensers and service stations and, more particularly, to a system to effectively determine a vehicle's position relative to a unique fueling position and control the fuel dispenser's vapor recovery system depending on the presence of an on-board recovery vapor recovery (ORVR) system on the vehicle.

It is well-known in the art at this time to provide communications between a fuel delivery system and a vehicle. Many systems are available which are capable of recognizing a vehicle automatically and providing communications to and from the vehicle from a fuel dispenser to keep track of customer billing or automobile diagnostics. U.S. Pat. Nos. 5,072,380 to Randelman et al. and 5,557,268 to Hughes et al. are exemplary of these systems. U.S. Pat. Nos. 5,359,522 and 5,204,819 to Ryan disclose the use of two-way RF communication systems between a vehicle computer and a fuel dispenser computer. The communication systems provide automatic activation of the fuel delivery transaction, identification of the fluid container for security and billing purposes, automatic payment without use of an identification card and memorializing fluid delivery transactions. Also disclosed is a passive communication device which uses part of the transmitted energy from the fuel dispenser for power.

U.S. Pat. No. 5,383,500 to Dwars et al. discloses a system controlling the automatic refueling of vehicles in a manner allowing a customer to control the refueling procedure without exiting the vehicle. The communications system has the capability to start, monitor and finish the refueling procedure by transmitting and receiving data signals concerning the refueling procedure, such as signals which start the refueling procedure and interrupt that procedure. Communication between the vehicle and dispenser is possible through infrared, electromagnetic or acoustic wave transmission.

U.S. Pat. No. 5,343,906 to Tibbels, III discloses a communication system linking a computer of a vehicle to a computer of a fuel dispenser via an electrical or fiber optic connection. The system validates emissions by monitoring various emissions and diagnostic aspects of the vehicle, storing the information and communicating the information to a fuel dispenser. The system is capable of maintaining a record of the vehicle's fueling and emissions history.

U.S. Pat. No. 4,934,419 to LaMont et al. discloses a fuel management system where an on-board computer communicates with a fuel dispenser using fiber optics. The disclosure primarily focuses on the management of information used in the operation of fleet vehicles. U.S. Pat. No. 5,156,198 to Hall discloses the use of a common core transformer for communications between a vehicle's on-board computer and a fuel dispenser computer. The dispenser identifies the vehicle, the amount of fuel supplied to the vehicle, the vehicle mileage since the last fueling, the date of such fueling, and the time of actual use of the vehicle.

The above references are indicative of the state-of-the-art relating to communications between a vehicle and a fuel dispenser. Various communication methods are used in such communications and a variety of information ranging from fueling information and vehicle identification to a emission control and vehicle monitoring are disclosed. However, none of the references discuss or suggest controlling a fuel dispenser's vapor recovery system based on the presence of an ORVR system or determining the proximity or location of a vehicle with respect to a unique fueling position of a dispenser.

In some areas of the country, especially in high population density regions, fuel dispensers are already required to have vapor recovery systems to remove fuel vapors expelled from the vehicle's fuel fill neck during the in-rush of fuel during the fueling operation. In addition to vapor recovery systems on fuel dispensers, various environmental regulations will require vapor recovery systems on motor vehicles in the future. As noted, these on-board vapor recovery systems are generally referred to as ORVR systems. Difficulty arises when an ORVR-equipped vehicle is refueled at a fuel dispenser having a vapor recovery system. In certain instances, the vacuum created by the respective vapor recovery systems may cause false triggering of the fuel dispenser nozzle's cut-off mechanism, in addition to wasting energy and causing additional wear and tear by redundantly operating two vapor recovery systems. Furthermore, the simultaneous running of opposing vapor recovery systems may adversely affect the ultimate goal of, vapor recovery performance.

For the past several years, the California Air Resources Board has proposed various regulations to limit the amount of fuel vapor released into the atmosphere during the refueling of a motor vehicle. During a conventional or standard fueling operation, incoming fuel displaces fuel vapor from the head space of a fuel tank and out through the fill pipe into the atmosphere, if not contained and recovered. The air pollution resulting from this situation is undesirable. Currently, many fuel dispensing pumps at service stations are equipped with vapor recovery systems that collect fuel vapor expelled from the fuel tank filler pipe during the refueling operation and transfer the vapor to a fuel storage tank.

Recently, ORVR systems have been developed in which the head space in the vehicle fuel tank is vented through a charcoal-filled canister so that the vapor is adsorbed by the charcoal. Subsequently, the fuel vapors are withdrawn from the canister into the engine intake manifold for mixture and combustion with the normal fuel and air mixture.

In typical ORVR systems, a canister outlet is connected to the intake manifold of the vehicle engine through a normally closed purge valve. The canister is intermittently subjected to the intake manifold vacuum with the opening and closing of the purge valve between the canister and intake manifold. A computer which monitors various vehicle operating conditions controls the opening and closing of the purge valve to assure that the fuel mixture established by the fuel injection system is not overly enriched by the addition of fuel vapor from the canister to the mixture.

Fuel dispensing systems having vacuum-assisted vapor recovery capability which are unable to detect vehicles equipped with ORVR systems will waste energy, increase wear and tear, ingest excessive air into the underground storage tank and cause excessive pressure build-up in the underground tank due to the expanded volume of hydrocarbon-saturated air. Recognizing an ORVR system and adjusting the fuel dispenser vapor recovery system accordingly eliminates the redundancy associated with operating two vapor recovery systems for one fueling operation. The problem of incompatibility of assisted vapor recovery and ORVR was discussed in "Estimated Hydrocarbon Emissions of Phase II and On-Board Vapor Recovery Systems"

dated Apr. 12, 1994, amended May 24, 1994, by the California Air Resources Board (CARB). That paper mentions the possible use of a "smart" interface nozzle to detect an ORVR vehicle and close one vapor intake valve on the nozzle when an ORVR vehicle is being filled.

Adjusting the fuel dispenser's vapor recovery system will mitigate fugitive emissions by reducing underground tank pressure. Reducing underground tank pressure minimizes the "breathing" associated with pressure differentials between the underground tank and ambient pressure levels. If the vacuum created by the fuel dispenser's vapor recovery system is not reduced or shut off, the underground tank pressure will increase to the extent that hydrocarbons are released through a pressure vacuum valve or breathing cap associated with the underground tank. Reducing the vacuum created by the fuel dispenser's vapor recovery system when an ORVR system is detected prevents the ingestion of a volume of excess air into the underground tank. Adjusting the fuel dispenser's vapor recovery system in this manner minimizes breathing losses associated with the underground tank.

Thus, there remains a need for a fuel dispensing system with a vapor recovery system having the ability to detect a vehicle having an ORVR system and adjust its vapor recovery system when an ORVR system is detected to reduce breathing losses and wear and tear, as well as conserve energy.

Prior to controlling the fuel dispenser's vapor recovery system, or transferring any other type of information between the vehicle and dispenser, the dispenser must first identify the presence of the vehicle and, in more sophisticated applications, interrogate the vehicle's communication device. This becomes a problem in modem service stations which have multiple-sided fueling positions associated with each dispenser in addition to having several of these dispensers located in close proximity to one another.

Although various ways of communicating with a vehicle during fueling are known, the current state-of-the-art has not yet addressed the problem that a modem service station will face when these systems are placed in each of a plurality of closely spaced fuel dispensers. Typically, each dispenser will include a communication system for two fueling positions associated with that dispenser.

In larger service stations, it will not be uncommon for ten or more intelligent fueling operations to occur at any one time. Communication links are preferably remote without requiring a physical hard-wired connection. Each fueling position should be able to communicate with the vehicle at that position without causing interference to or being interfered by other fueling position and, particularly, from the other fueling position associated with that fuel dispenser.

The fuel dispensers must determine which dispenser a vehicle is approaching and to what position or side of the dispenser the vehicle will use. The prior art does not address this issue. Although U.S. Pat. No. 5,072,380 to Randelman et al. discloses a means of detecting the direction of a vehicle as it approaches the fueling area and a means for determining if the vehicle has stopped moving, there is no solution to the problem of distinguishing the side of the fuel dispenser at which the vehicle has stopped. Furthermore, as these systems are gradually implemented in-consumer applications, determining the exact location of the vehicle in the service station environment will become more important. Fueling station for fleet applications have not been faced with the large number of fueling positions and transactions that a neighborhood service station will face once intelligent fueling is implemented.

Thus, there is a further need for a fuel dispenser and system capable of determining the proximity of a vehicle to a fuel station and preferably the exact location of the vehicle relative to a unique fueling position to eliminate the potential for the erroneous activation of a fueling position on the wrong side of the dispenser or even a different dispenser altogether.

SUMMARY OF THE INVENTION

The present invention is directed to a fuel dispenser system capable of receiving a signal from a vehicle transmitter. A first aspect of the present invention is directed to a fuel dispenser system capable of receiving a signal from a vehicle transmitter. Upon receiving the signal from the transmitter, the dispenser determines the proximity of the vehicle relative to the dispenser, and preferably, a particular fuelling position associated with that dispenser. The transmitter will typically be a transponder arranged to be interrogated at the fueling position, and the term "transponder" will be used throughout the rest of the description. Note that the term "transponder" is considered to include any device capable of one or two-way communications in-passive or active embodiments. Active devices are typically battery or vehicle powered, while passive devices are generally powered by energy received from the dispenser's transmittal signal. In either embodiment, both the vehicle and dispenser may have various levels of processing and memory capacity. Depending on the complexity of the desired application, the transponder may emit only a single frequency or provide real-time, fuel-duplex data transfer.

Proximity is determined by measuring one or more characteristics of the signal received at a receiver and sensor associated with the dispenser, typically the sensor is an antenna, but this signal could be received by an optical, acoustic, infrared or other such sensor. However, a "receiver" and "antenna" will be referred to and described in the rest of this description.

Upon receiving the transponder's signal, the dispenser determines the proximity of the vehicle relative to the dispenser, and preferably, a particular fueling position associated with that dispenser. Proximity is determined by measuring one or more characteristics of the signal received at an antenna associated with the dispenser. Generally, the strength or magnitude of the signal received at the antenna is the characteristic used to determine vehicle proximity. Multiple directionally sensitive antennas or receivers may be used to correlate a vehicle with a unique fueling position.

The dispenser controller is also configurable to monitor the transponder's signal received at various antenna locations throughout the service station environment and calculate an exact vehicle location. Preferably, the system monitors the location of all transponder equipped vehicles within the service station environment. The antennas may be located underground in the dispenser forecourt, within the dispensers, above the dispensers or anywhere convenient within the service station environment. Preferably, each dispenser controller is connected to antennas located in each dispenser and adapted to multiplex the signal received at each antenna and, based upon characteristics of the received signal, calculate the vehicle location. For example, triangulation of the vehicle location could be accomplished by measuring the differences in phase of the transponder's signal received at each of the various antennas. Remote communications can be carried out between the vehicle dispenser and a central site control. Preferably, each device uses a transceiver to integrate the transmitting and receiving functions.

The controller is also configured to receive a signal from the transponder indicative of the presence of an ORVR system on the vehicle. Depending on the sophistication of the communication link between the transponder and dispenser, the dispenser will control its vapor recovery system accordingly. If an ORVR equipped vehicle is detected, the dispenser may deactivate the dispenser's vapor recovery system or modify the vapor recovery system performance to maximize vapor recovery or retrieve a sufficient amount of air to reduce breathing of the underground storage tank.

Each of the above-mentioned embodiments, will function using simple one-way communications from the vehicle transponder to the dispenser. Implementing two-way communications allows for information and data transfer between the vehicle and dispenser. This information may include identification of the vehicle fuel type, vehicle operator and fueling restrictions as well as determining the presence of ORVR equipment. Such communications may be used to prevent vehicle misfueling, restrict or eliminate unauthorized fueling of non-vehicular tanks or containers, allow fueling above the EPA mandated ten gallons per minute fueling limit while meeting the EPA's fuel spillage requirements, minimize fueling time and time for payment and eliminate the use of plastic cards and pin numbers. The use of sophisticated information transfer will greatly increase the ability to merchandise customers on an individual basis, taking in consideration their individual purchasing history. Vehicle diagnostic information may be accessed during the fueling operation in order to communicate such information to the appropriate regulatory agencies or inform the customer of the vehicle's diagnostic status. The dispenser could be configured to download software to correct environmental control problems on a defective motor vehicle and to monitor the vehicle during subsequent fueling operations to assure that environmental control system defects have been corrected. Furthermore, the fuel dispenser could download various intelligence to the vehicle during fueling operation, such as local area map and navigation data, among other intelligent vehicle highway system (IVHS) functions. Various encryption techniques are available to protect sensitive information during communications.

The fueling system includes multiple intelligent dispensers having card readers and displays operating under the control of or in conjunction with a central station controller having off-site communication links with point-of-sale networks, customer data bases and regulatory agencies. Accordingly, one aspect of the present invention is to provide a fuel delivery system capable of determining a vehicle's position relative to a unique fueling position including a fuel dispenser having multiple fueling positions, a controller associated with the fuel dispenser and a receiver associated with the controller. An antenna is included to receive a signal emitted from a transponder on a vehicle. The controller determines a relative proximity of the vehicle to one of the fueling positions by measuring a characteristic, such as the strength or magnitude of the transponder signal received at the antenna. As noted above, the transponder and the fuel delivery system may use either one-way or two-way communications at any level of communication sophistication.

In order to determine the proximity to a unique fueling position, an antenna may be placed at each fueling position and configured to determine a direction as well as a relative proximity of the vehicle to that fueling position. Multiple antennas at various locations throughout the service station environment, including within each fuel dispenser, may be used to triangulate an exact vehicle location throughout the service station environment.

Another aspect of the present invention is to provide a fuel delivery system capable of controlling a fuel dispenser's vapor recovery system based on the presence of an on-board vapor recovery system on the vehicle. This system includes a fuel dispenser having a vapor recovery system, a controller capable of controlling the vapor recovery system, a receiver and an antenna operating in conjunction with the receiver to receive a signal emitted from a transponder on a vehicle indicative of the presence of an on-board vapor recovery system. When the controller determines from the transponder signal that an on-board vapor recovery system is present, the controller will control its vapor recovery system accordingly. Such vapor recovery system control may include completely deactivating the system or modifying the system to maximize vapor recovery or reduce underground storage tank breathing loses by controlling the intake of air into the underground storage tank. More sophisticated systems may alert the fuel dispenser when the vehicle's on-board vapor recovery system fails or otherwise malfunctions. In these cases, the vapor recovery system may activate to compensate for the vehicle's vapor recovery system malfunction.

These and other aspects of the present invention will become apparent to those skilled in the art after reading the following description of the preferred embodiments when considered with the drawings.

DETAILED DESCRIPTION OF THE PREFERRED EMBODIMENT

Figure 1:
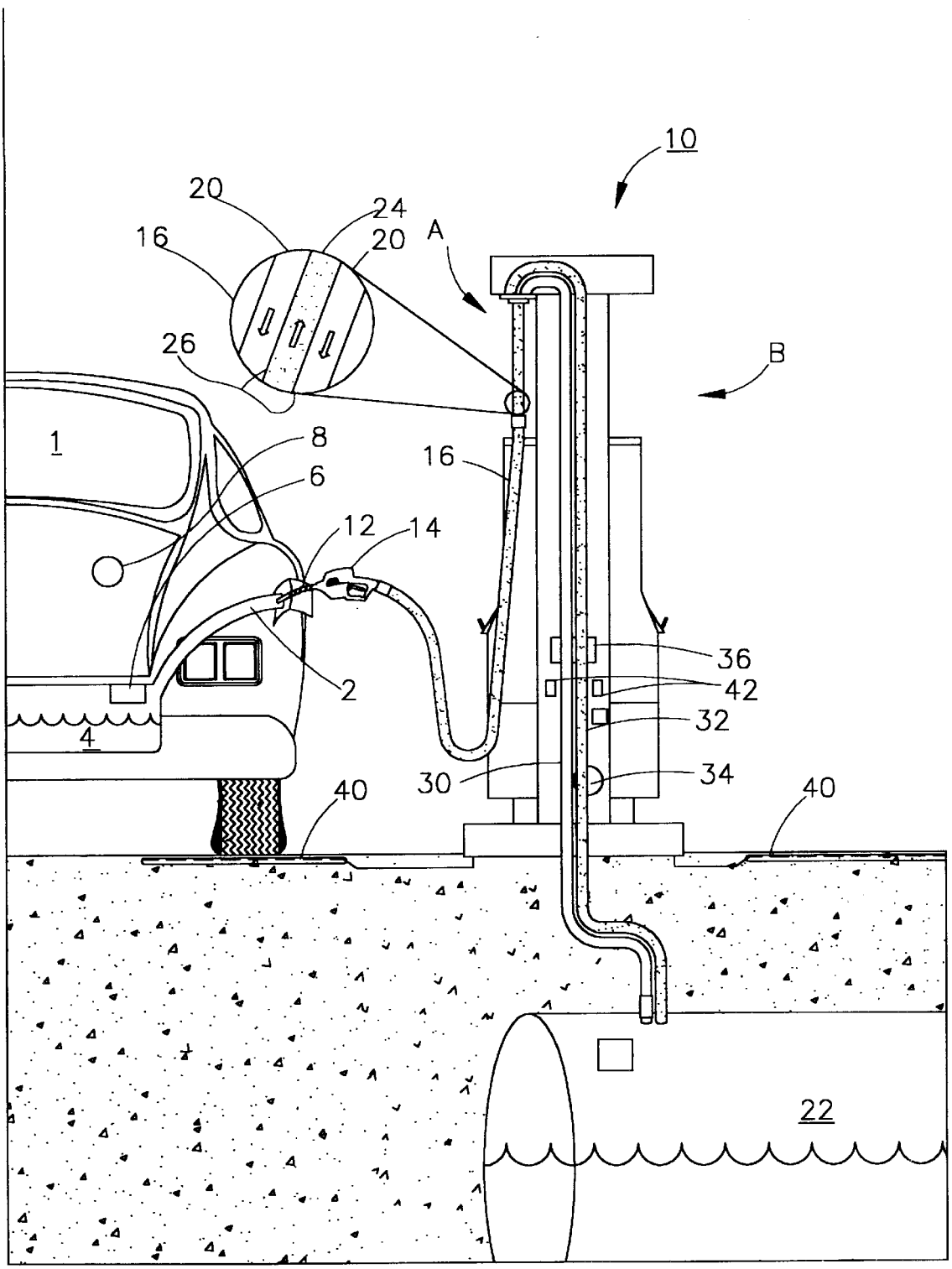
FIG. 1 is an elevational and partial sectional view of a typical gasoline dispenser having a vapor recovery system and a vehicle being fueled thereby.

Referring now to the drawings in general, and FIG. 1 in particular, it will be understood that the illustrations are for the purpose of describing a preferred embodiment of the invention and are not intended to limit the invention thereto. As best seen in FIG. 1, in a typical service station, a vehicle 1 is shown being fueled from a gasoline dispenser 10. A spout 12 of nozzle 14 is shown inserted into a filler pipe 2 of a fuel tank 4 during the refueling of the vehicle 1.

A fuel delivery hose 16 having vapor recovery capability is connected at one end to the nozzle 14, and at its other end to the fuel dispenser 10. As shown by the enlarged cutaway view of the interior of the fuel delivery hose 16, an annular fuel delivery passageway 20 is formed within the fuel delivery hose 16 for distributing gasoline pumped from an underground storage tank 22 to the nozzle 14. Also within the fuel delivery hose 16 is a tubular vapor recovery passageway 24 for transferring fuel vapors expelled from the vehicle's fuel tank 4 to the underground storage tank 22 during the fueling of a vehicle that is not equipped with an onboard vapor recovery system. The fuel delivery hose 16 is depicted as having an internal vapor recovery hose 26 for creating the vapor recovery passage from the spout 12 to the underground storage tank 22. Inside the dispenser 10, fuel is carried to hose 16 by piping 30, and vapor is returned through recovery hose 32.

A vapor recovery pump 34 provides a vacuum in the vapor recovery passage for removing fuel vapor during a refueling operation. The vapor recovery pump 34 may be placed anywhere along the vapor recovery passage between the nozzle 12 and the underground fuel storage tank 22. The vapor recovery system using the pump 14 may be any suitable system, such as those shown in U.S. Pat. Nos. 5,040,577 to Pope, 5,195,564 to Spalding, 5,333,655 to Bergamini et al., or 3,016,928 to Brandt. Various ones of these systems are now in commercial use recovering vapor during refueling of conventional non-ORVR vehicles. The present invention addresses an adaptation of those systems for use with ORVR vehicles.

As shown in FIG. 1, the vehicle 1 is equipped with an ORVR system 6 to minimize the amount of fuel vapor expelled from the filler pipe 2 during fueling. Additionally, the vehicle 1 includes a transponder 8 for communicating with the dispenser 10. The transponder 8 may be as simple as a transmitter adapted only to emit a single frequency or as complex as a transceiver and controller adapted to provide fuel-duplex, real-time communications between the vehicle 1 and dispenser 10. The dispenser 10 will normally include a dispenser controller 36 with a receiver associated with one or more antennas, such as the buried antennas 40 in the forecourt or one more internal antennas 42. The antennas may be placed anywhere within the service station environment, such as on an overhead awning or along the perimeter of the position. Thus, these antenna do not necessarily need to be placed within or near the dispensers 10 in certain embodiments discussed below. Furthermore, "antenna" is used in a most generic sense and includes sensors capable of picking up numerous types of signals emitted from a vehicle transmitter or transponder 8, such as electromagnetic, acoustic, infrared and optic signals.

Figure 2:
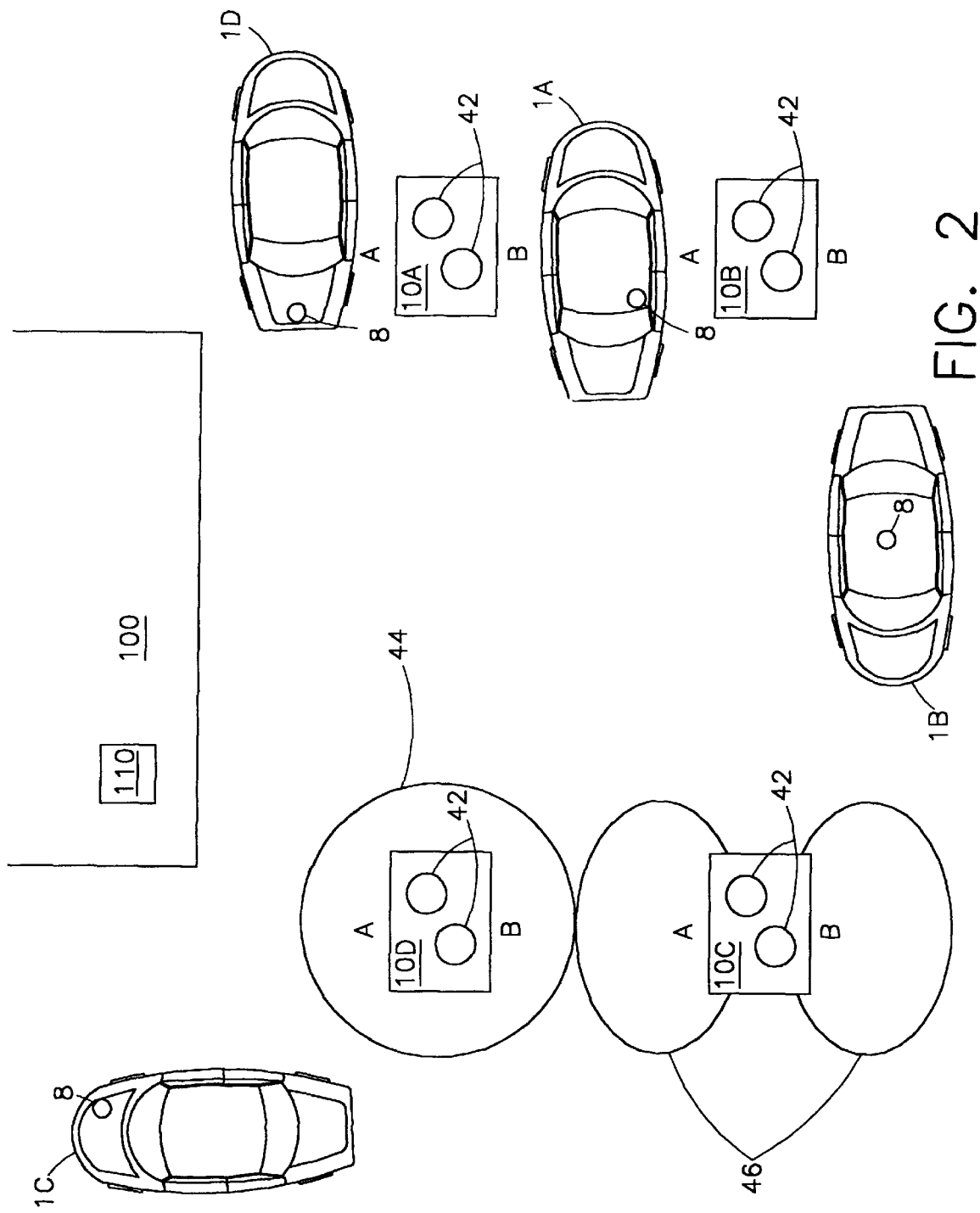
FIG. 2 is an overhead schematic of a service station and dispenser system configured to monitor the proximity of transponder equipped vehicles relative to a particular dispenser and fueling position.

Turning now to FIG. 2, a basic service station environment is shown having a station store 100 with a central site controller 110 configured to communicate with each of the dispensers 10A–D. Multiple vehicles 1A–D are also depicted in and around the various fuel dispensers 10A–D. The embodiment of FIG. 2 include multiple dispenser antennas 42 mounted within the various dispensers 10A–D. Notably, the central site controller 110 may be configured to communicate with and determine the position of the vehicle. In such a configuration the antennas are directly associated with the site controller 110 and the individual dispensers 10A–D are controlled accordingly by the site controller based on vehicle location.

The antennas 42 and the associated receivers and controllers 36 are adapted to determine the proximity of a vehicle relative to a particular fueling positions A, B associated with each dispenser 10A–D. Different reception patterns are depicted in association with dispenser 10D and dispenser 10C. A circular reception pattern 44 is shown at dispenser 10D while a dual-lobed pattern 46 is shown associated with dispenser 10C.

The basic circular pattern 44 would be used to determine the proximity of any one or all of the vehicles 1A–1D, with respect to the dispenser 10D. Typically, only one antenna 42 is required for such an embodiment. As a vehicle approaches the dispenser 10D, its corresponding receiver and controller 36 will receive a signal transmitted from the transponder 8. The controller 36 will analyze certain characteristics of the signal, such as magnitude or strength, to determine a relative proximity to the dispenser. The basic circular pattern 44 associated with dispenser 10D generally would not be able to distinguish which side, or fueling positions A, B, the vehicle 1 is positioned.

Figure 7:
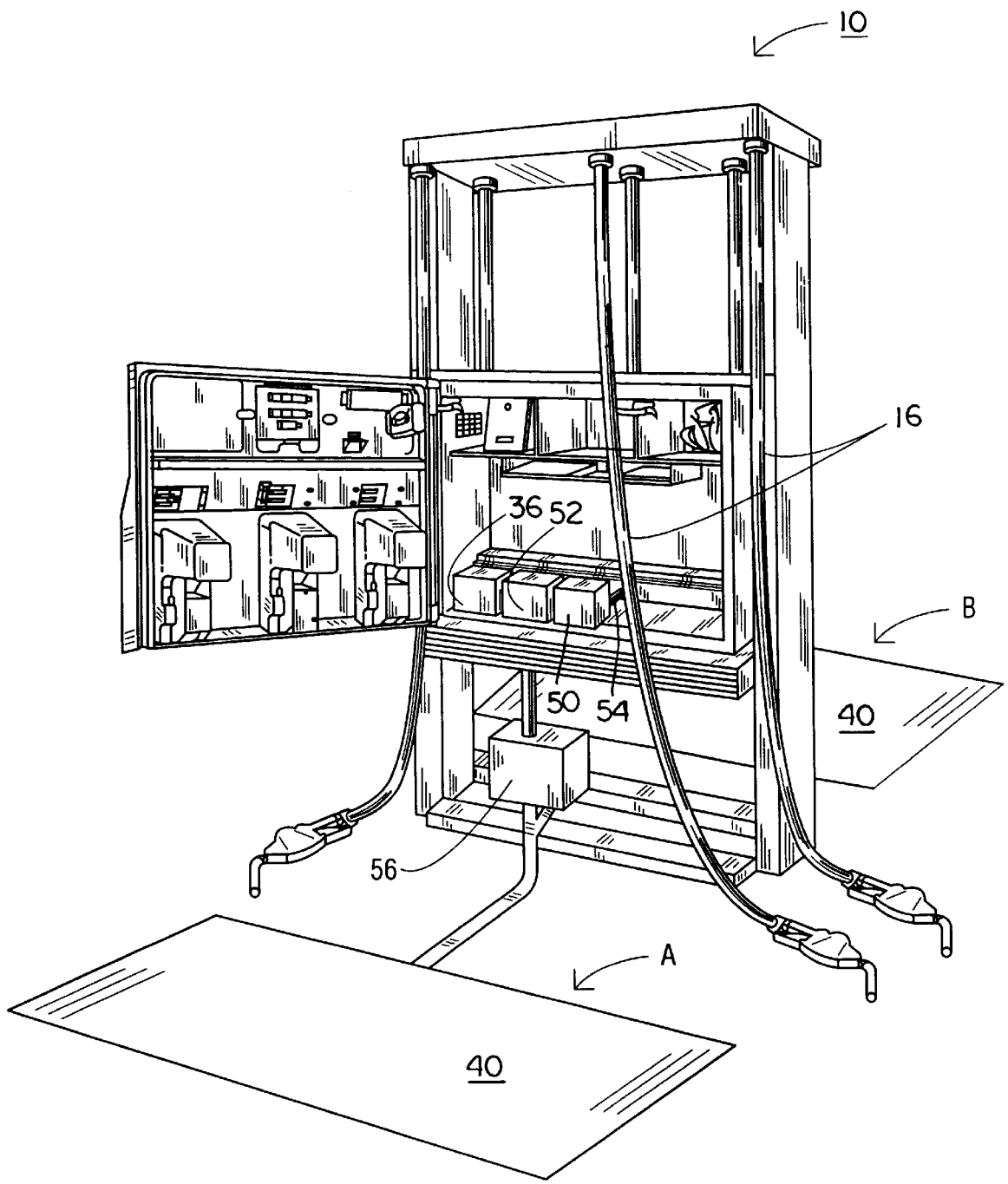
FIG. 7 is a perspective view of a fuel dispenser constructed according to the current invention.

The dual-lobed pattern 46 associated with dispenser 10C provides the ability to determine which fueling position A, B at which the vehicle is located. In order to determine the particular fueling position A, B, a directional component is necessary in addition to the proximity component described above. To provide this directional component, multiple antennas may be used to create various types of reception lobes or the antennas may be configured to only receive signals from certain preset directions. Regardless of the configuration, the receiver and controller 36 will monitor a characteristic of the signal determinative of proximity, such as magnitude or strength, in conjunction with determining what side of the dispenser A, B, to which the signal appears most proximate. In the dual-lobed embodiment associated with dispenser 10C, the receiver controller 36 could measure the signal characteristics received at both antennas 42 and determine from which antenna the received signal was strongest to determine direction. Placing the antennas 40 in the forecourt under each fueling position (as shown in FIGS. 1 and 7) allows for easy determination of vehicle placement relative to a fueling position.

Figure 3A:
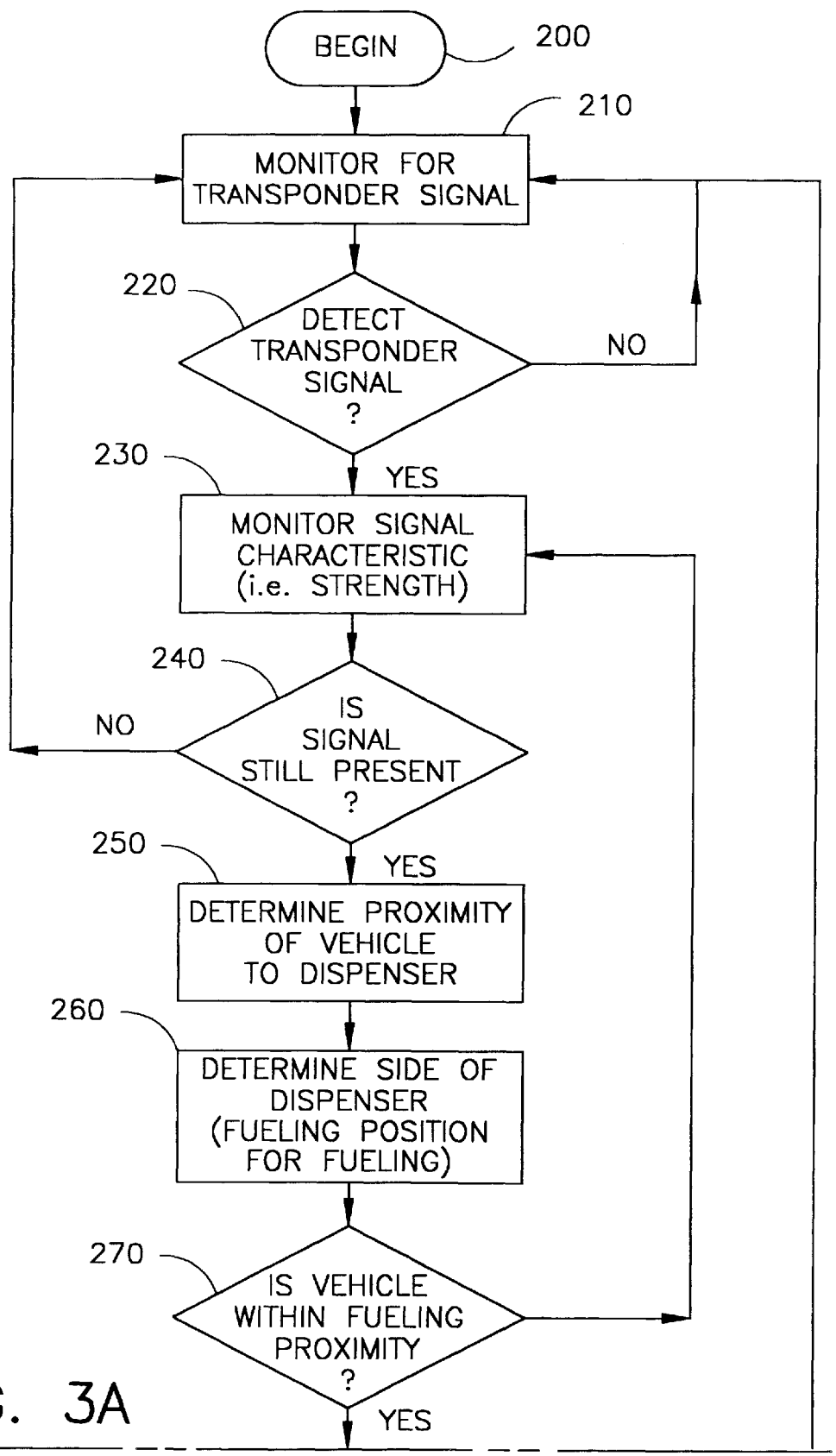
FIGS. 3A and 3B are a flow chart for monitoring and determining the proximity of a transponder equipped vehicle relative to a fuel dispenser and fueling position.
Figure 3B:
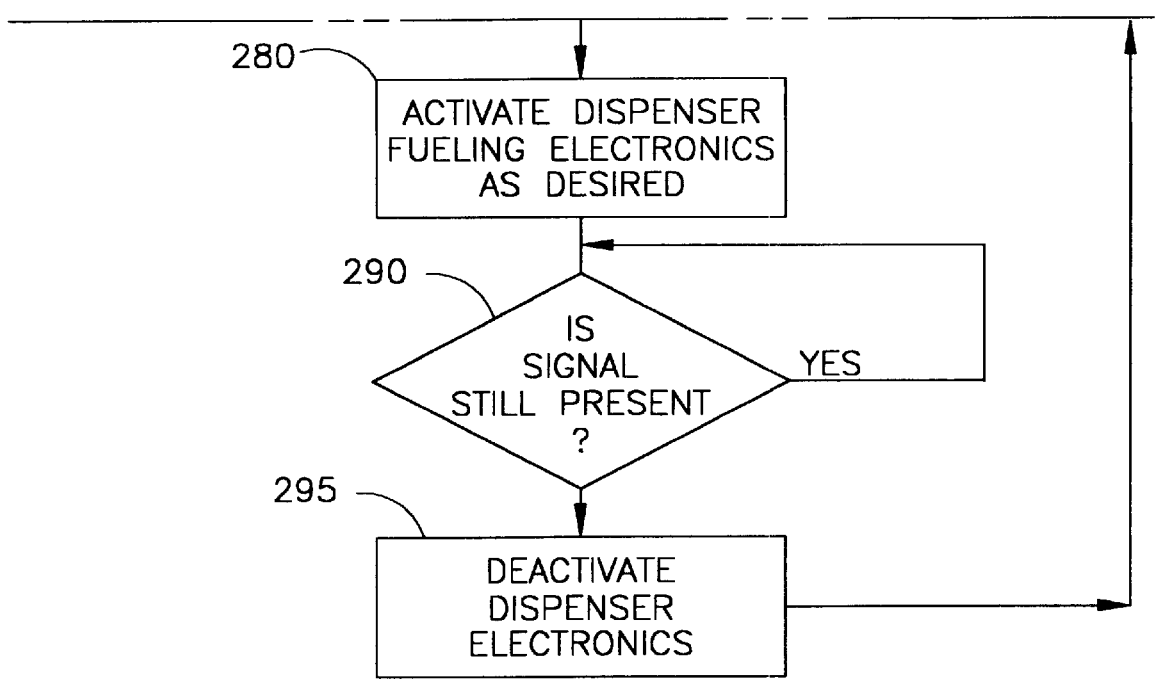

The flow chart of FIGS. 3A and 3B, outlines the process undertaken by the controller 36 in determining the proximity of one or more of the vehicles 1A–1D, with respect to a particular fueling positions A, B for dispenser 10C. The process begins at block 200 wherein the controller 36 begins to monitor for a transponder signal at block 210. Upon detection of a transponder signal at block 220, the controller 36 will monitor a characteristic, such as strength or magnitude of the signal at block 230. At this point, the controller 36 realizes a vehicle 1 is near or approaching the dispenser 10C and continually monitors for the presence of the signal at decision block 240. If the signal is lost, the vehicle has left the reception area and the controller 36 begins to monitor for a new transponder signal at block 210. If the signal remains present, the controller 36 determines the proximity of the vehicle with respect to the dispenser at block 250.

In order to determine the particular feeling position A, B, the controller 36 must determine to which side of the dispenser 10C the vehicle 1 is at or approaching at block 260. As noted, the controller 36 may simply monitor for signal strength or magnitude received at opposing directionally sensitive antennas 42.

As the vehicle proceeds to a particular fueling position A, B, the controller 36 determines if the vehicle is within a certain fueling proximity at decision block 270. When the vehicle is within fueling proximity, it is in a position close enough to the fuel dispenser 10C and fueling positions A, B, to allow for fueling of the vehicle. If the vehicle is not within fueling proximity, the controller 36 continues to monitor the strength and direction of the signal at blocks 230–260.

Once the vehicle is in position for fueling, the controller 36 activates the dispenser's fueling electronics as desired at block 280. During the fueling operation, the controller 36 continues to monitor for the presence of the signal at decision block 290. When the signal is no longer present, the dispenser electronics are deactivated at block 295 and the controller 36 monitors for the next transponder signal at block 210 wherein the process is repeated.

Figure 4:
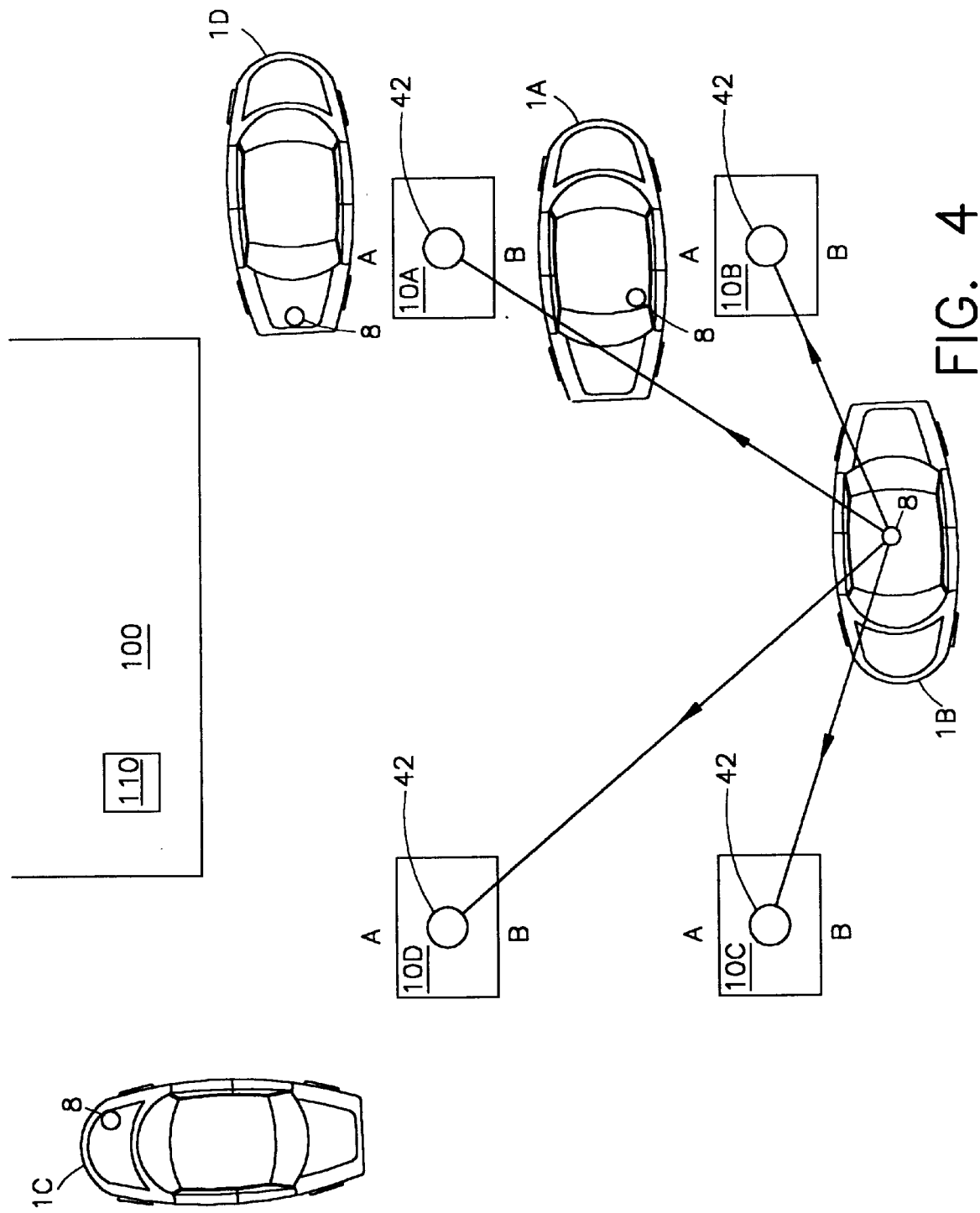
FIG. 4 is an overhead schematic of a service station having a dispenser system configured to determine the location of a transponder equipped vehicle within the service station fueling and retail areas.

FIG. 4 shows an embodiment wherein the location of vehicles 1A through D may be tracked as they travel throughout the service station environment. In this embodiment, each dispenser 10A–D includes one antenna 42 capable of receiving a signal from the transponder of vehicle 1B. Preferably, each of the antennas 42 are multiplexed to each controller 36 associated with each dispenser 10A–D. The various controllers 36 will receive the transponder signal and monitor the location of the vehicle and determine the dispenser 10A–D and fueling position A, B, at which the vehicle stops. The controllers 36, may, for example, monitor a characteristic, such as the phase shift, of the signal received at the various antennas 42 associated with the dispensers 10A–D and use known computational techniques, based on characteristics of the signal received at the various locations, to determine vehicle location. One such technique using phase differences is triangulation.

Although the signal from transponder 8 of vehicle 1B is the only signal depicted, the various dispensers 10A–D and/or the site controller 110 may monitor for the presence and location of a plurality of vehicles to determine proximity, direction of travel and location throughout the respective visit. Once vehicle location is determined, the site controller 110 may communicate with the appropriate fueling position of the dispenser 10, the vehicle and/or an external source to transfer information relating to the vehicle, vehicle operator and/or the fueling operation.

Triangulation and other similar positioning techniques generally require at least two antennas and provide better resolution as the number of antennas 42 are increased. Furthermore, the position of the antennas 42 may be virtually anywhere. An alternative to multiplexing the various dispenser antennas is to use two antennas in each dispenser or multiple antennas placed throughout the fueling area. A global positioning system (GPS) may be used to communicate vehicle position to the site controller 110 or the respective fuel dispenser 10.

Figure 5:
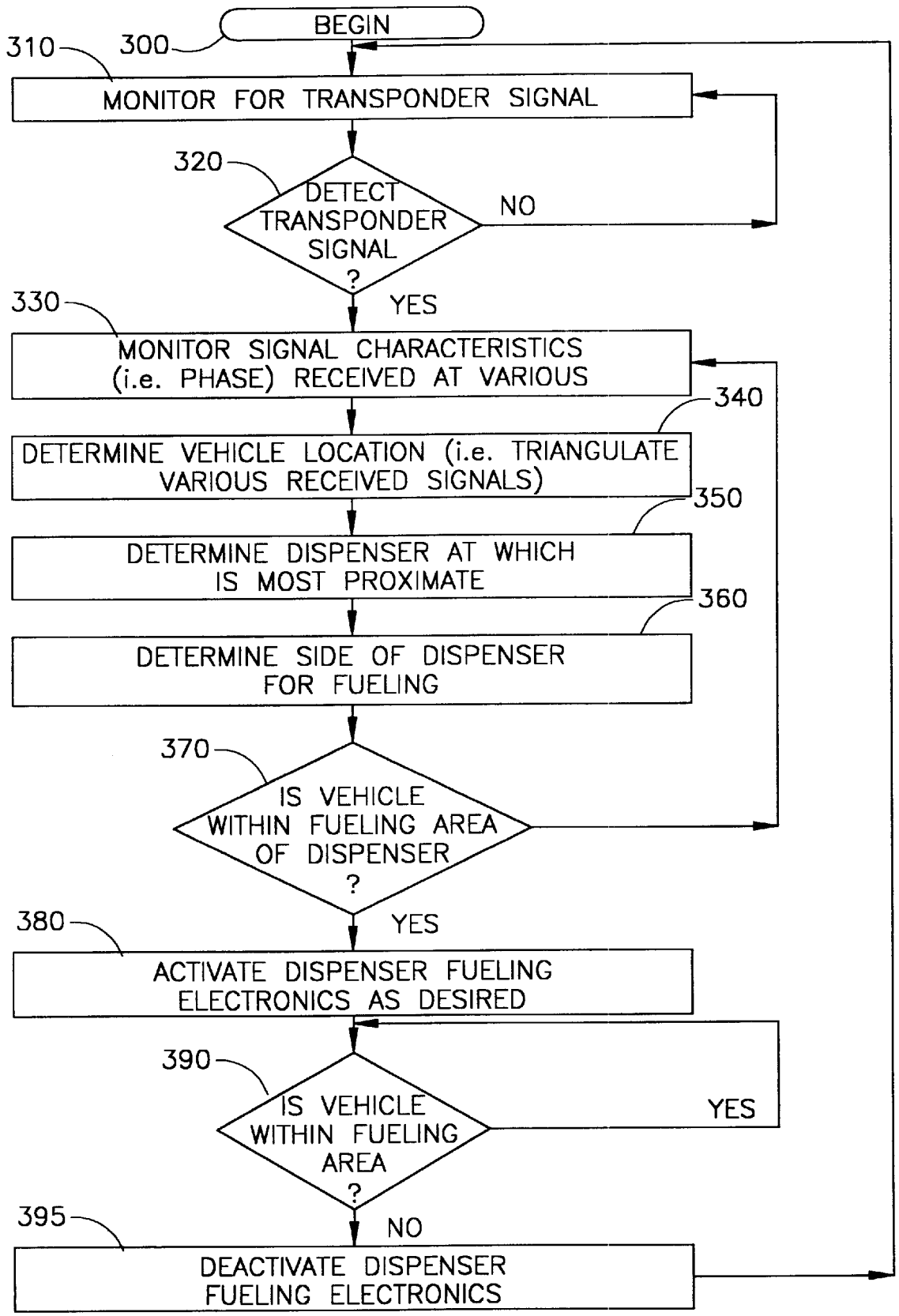
FIG. 5 is a flow chart for monitoring and determining the location of a transponder equipped vehicle within the service station fueling and retail areas.

The flow chart of FIG. 5 outlines the control process for the embodiment depicted in FIG. 4. The process begins at block 300 and initially monitors for the presence of a transponder signal at block 310. Once the signal is received at decision block 320, the controller 36 monitors the characteristics of the signal at the various antennas at block 330. The controller 36 will next determine the location of the vehicle at block 340 using the monitored signal characteristics at the various antennas to triangulate vehicle location. The pump and fueling position that the fueling operation will take place is determined at blocks 350 and 360 by determining the location at which the vehicle has stopped. The respective controller 36 will determine if the vehicle is within the fueling area at decision block 370. If the vehicle is within the fueling area, the dispenser's fueling electronics are activated as desired at block 380. The controller 36 will continually monitor the location of the vehicle and determine if the vehicle remains within the fueling area at decision block 390. Once the fueling operation is over and the vehicle has left the fueling area, the controller 36 deactivates the dispensers fueling electronics at block 395 and returns to block 310 to monitor for a new transponder signal, whereupon the process is repeated.

The communications between the transponder 8 and the dispenser 10 may range from a simplistic one-way carrier signal transmitted to the dispenser to a sophisticated two-way communication system where the vehicle 1 and dispenser interact with one another to transmit various types of information to and from the vehicle. Furthermore, the transponder 8 on the vehicle 1 may be active or passive wherein power is derived from another source, such as the transmitting power from the dispenser 10 itself.

FIG. 7 shows an embodiment of a fuel dispenser constructed according to the present invention. This embodiment clearly depicts the underground antennas 40 corresponding to fueling positions A and B, in this embodiment, the underground antennas 40 are multiplexed at the antenna multiplexor and dispenser interface 50. The multiplexor 50 sends the multiplexed signals received by the antenna 50 to transceiver 52 and the controller 36. A communications interface 54 is used to communicate with the site controller 110. Intrinsically safe barriers 56 are used to provide electrical isolation between the antennas 40 and the multiplexor 50.

As an example, the fueling system may be an electronic type with card readers in the head of the dispensers. Each of the dispensers are under the control of the site controller 110 and has off-site communication links with point-of-sale networks, customer data bases and regulatory agencies. The vehicles are equipped with a passive (or active) transponder 8 preferably located underneath the vehicle 1, inside the fuel door, near the filler neck or in the taillight housing. Other options may include placing the transponder 8 within a card carried by the operator or otherwise attached to the vehicle as a sticker or label. The transponder 8 is oriented for communication with an antenna 40 buried underneath the surface of the driveway corresponding to a certain fueling position or mounted in or on the fuel dispenser 10. The dispenser 10 is in communication with the antennas 40 buried underneath the surface of the fueling position and located so as to communicate with the vehicle positioned in that particular fueling position. A transceiver associated with the dispenser controller 36 is located in each dispenser 10 and is multiplexed to each of the two antennas associated with the two fueling positions for the dispenser 10. The dispenser transceiver of controller 36 communicates with the vehicle transponder and forwards vehicle information to the dispensers for appropriate action. A transceiver at the site controller 110 is further coupled with a suitable antenna system designed to also communicate with the vehicle transponders. Information from the dispenser transceiver and control system 36 is fed to the site controller 110 to identify a specific vehicle with a specific dispenser fueling position. This information is used by the site controller 110 to communicate with the appropriate vehicle 1. Information from the vehicle and the dispenser is available to the site controller for use in off-site transmission of data and off-site data is fed to the site controller 110 for communication to the appropriate vehicle 1.

Figure 6:
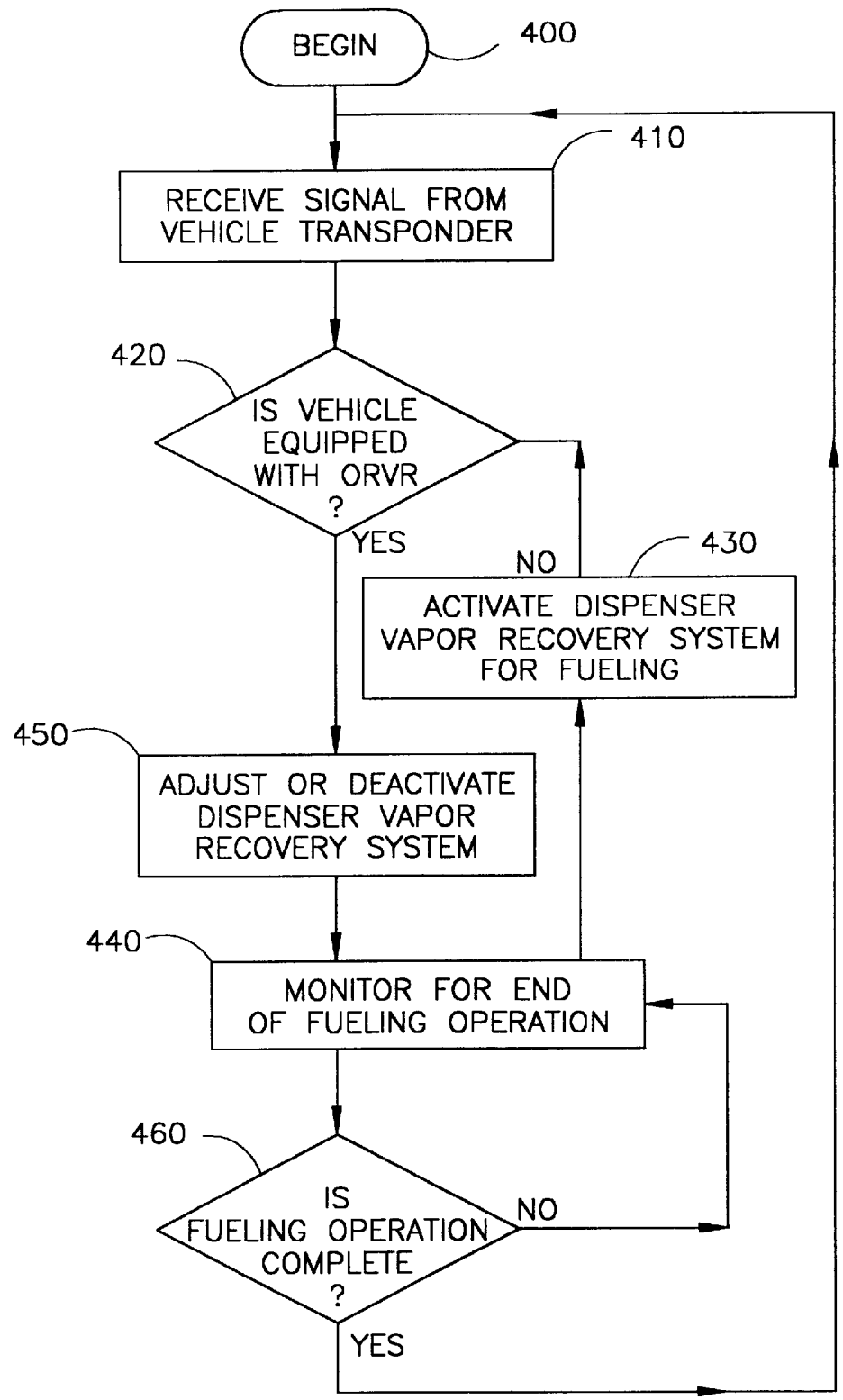
FIG. 6 is a flow chart for controlling a dispensers vapor recovery system according to the presence or absence of a vehicle equipped with a transponder and an onboard vapor recovery system.

Of particular importance in the current invention, the transponder 8 may be configured to transmit a signal indicative of the presence of an ORVR system. When a dispenser 10 receives a signal indicating the presence of an ORVR system, the vapor recovery system of the dispenser 10 may be shut-off or modified as desired during the subsequent fueling operation. A simplistic approach incorporates a one-way communication from the transponder 8 to the dispenser 10 to signal the presence of an ORVR system. Notably, this source signal may be used to determine the vehicle's proximity or location relative to the fueling position. Upon receipt of this signal, the dispenser 10 will deactivate the vapor recovery system during the fueling operation. A more complex system may incorporate a two-way communication link between the transponder 8 and the dispenser 10 wherein information in addition to that regarding the presence of an ORVR system is included to enable the dispenser to control the vapor recovery system in conjunction with the vehicle's ORVR system to maximize vapor recovery and fuel flow rate. A basic flow chart of these processes is shown in FIG. 6. The process starts at block 400 wherein the controller 36 begins to monitor and receive signals from the vehicle's transponder at block 410. The controller 36 will determine whether the vehicle is equipped with an ORVR system at decision block 420. If the vehicle is not equipped with an ORVR system, the controller 36 will activate the dispensers vapor recovery system for the subsequent fueling operation at block 430. The controller 36 will monitor for the end of the fueling operation of block 440 and determine the end of the fueling operation of block 460. Once the fueling operation is complete, the process is repeated.

If the transponder tells the controller 36 that the vehicle is equipped with an ORVR system at decision block 420, the vehicle's vapor recovery system is adjusted or deactivated completely during the subsequent fueling operation at block 450. Preferably, the dispenser's vapor recovery system is simply shut-off when an ORVR equipped vehicle 1 is identified. Even if an ORVR equipped vehicle is detected, it may be desirable to have the dispenser's vapor recovery system operate to supply an amount of air to the storage tank required to replenish the volume of liquid taken from the tank during the fueling operation to minimize or eliminate tank breathing loses discussed above. In a more complex system, the transponder of the vehicle and dispenser may also communicate information relating to the effectiveness or the presence of a malfunction of the ORVR system. In such cases, the dispenser may further modify or activate the vapor recovery system accordingly to minimize the escape of vapors during the fueling operation.

In sum, once detection of an ORVR equipped vehicle occurs, various vapor recovery control options are available. Disabling the fuel dispensers vapor recovery system reduces underground fuel tank pressure and thereby reduces loses due to fugitive emissions and reduces wear and unnecessary use of assist-type vapor recovery systems when operation would be redundant. Alternatively, the dispenser's vapor recovery system is adjusted to reduce the vacuum created by the fuel dispenser during the fueling of an ORVR equipped vehicle. The vapor recovery system may provide enough ambient air to the underground tank, so that when the air saturates, the hydrocarbon saturated air volume is approximately equal to the amount of fuel dispensed, thereby minimizing pressure fluctuations in the underground tanks. Another option, particularly useful with liquid driven vapor pumps, is to use an output of the controller 36 to open a valve to ambient to redirect the air flow of the vapor recovery passage to atmosphere through an ambient tank vent (not shown).

Adjusting the vacuum created by the fuel dispensers vapor recovery system prevents over pressurizing the underground fuel tanks, thus mitigating fugitive emissions. Fugitive emissions is a collective term for emissions leaking to atmosphere at the dispensing facility. The current invention may adjust the fuel dispenser's vapor recovery system to compensate for both vapor shrink and vapor growth conditions. Typically, during vapor shrink conditions, an amount of air greater than the volume of liquid dispensed is drawn into the tank. Vapor shrink conditions usually occur during hot summer months when the ambient temperature is high and the tank temperature is relatively cool. As the air is drawn into the tank, the air contracts. The fuel dispenser compensates for this decrease in volume by increasing the amount of air pulled into the underground tank.

In contrast with the vapor shrink conditions, vapor growth conditions typically occur during winter months when the ambient temperature is low and the tank temperature is relatively high. Under vapor growth conditions, the air pulled into the tank expands when subjected to the warmer tank temperatures. The fuel dispenser's vapor recovery system pulls an amount of air less than the amount of fuel dispensed to compensate for the volume expansion in the tank. Alternatively, rough air ingestion compensation may be accomplished by having predefined flow settings for various times of the day or year. For example, the vapor recovery system can be set to ingest air or vapor mixture in an amount equal to two-thirds the volume of the fuel dispensed, thus allowing the air to vapor to expand by a factor of approximately 1.4 or 1.5 to fill the tank volume when saturated.

Preferably, ORVR determination and other vehicle/dispenser communications are established in conjunction with determining the vehicles location relative to a unique fueling position. Various other modifications and improvements will occur to those skilled in the art upon reading the foregoing description. It should be understood that all such modifications and improvements have been deleted herein for the sake of conciseness and readability but are properly within the scope of the following claims.

What is claimed is:

1. A fuel delivery system capable of determining a vehicle's position relative to a unique fueling position comprising:

a fuel dispenser having two opposite sides and a fueling position at each of said opposite sides said fueling positions being approachable by a vehicle to be fueled when the vehicle reaches the fueling position;

a controller operatively associated with said fuel dispenser;

communication electronics having two receivers associated with said controller and configured to receive a signal emitted from a transmitter on the vehicle;

said controller adapted to determine a relative proximity of the vehicle to both of said fueling positions by measuring a characteristic of the signal emitted from the transmitter received at each said receiver and to determine the particular fueling position at which the vehicle is located based on the relative proximity of the vehicle to the two fueling positions.

2. The fuel delivery system of claim 1 wherein said controller triangulates the vehicle location using the characteristics of the signal emitted from the transmitter received at each said receiver.

3. The fuel delivery system of claim 1 wherein each said fueling position has at least two said receivers associated therewith.

4. The fuel delivery system of claim 1 wherein said receivers are located within said dispenser.

5. The fuel delivery system of claim 1 wherein said receivers located outside of dispenser.

6. The fuel delivery system of claim 1 wherein said controller measures the magnitude of the signal from the transmitter at each said receiver.

7. The fuel delivery system of claim 1 wherein said controller measures the phase of the signal from the transmitter at each said receiver to compute vehicle location.

8. The fuel delivery system of claim 1 further including a plurality of fuel dispensers wherein each dispenser includes two receivers wherein each said receiver is associated with communication electronics in each said dispenser, said communication electronics being operatively associated with said controller to determine a relative location of the vehicle to a fueling position at one said dispenser by measuring a characteristic of the signal emitted from the transmitter received at each said receiver at each said dispenser.

9. The fuel delivery system of claim 1 wherein said controller is further adapted to determine if the vehicle is equipped with an on-board vapor recovery system upon reception of the signal from the transmitter.

10. The fuel delivery system of claim 1 further comprising a system transmitter operatively associated with said controller and said sensor for transmitting signals to the vehicle transmitter to facilitate bi-directional communications between the vehicle and said dispenser.

11. The fuel delivery system of claim 10 wherein said system transmitter and receiver are integrated in one transceiver.

12. The fuel delivery system of claim 10 wherein information relating to the vehicle fuel type is communicated between the vehicle and said controller.

13. The fuel delivery system of claim 10 wherein information relating to certain available fueling options is communicated between the vehicle and said controller.

14. The fuel delivery system of claim 10 wherein information relating to identification of onboard recovery vapor recovery type vehicle communicated between the vehicle and said controller at start of a fueling operation.

15. The fuel delivery system of claim 10 wherein information relating to restriction of unauthorized fueling of non-vehicular containers is communicated between the vehicle and said controller.

16. The fuel delivery system of claim 10 wherein information relating to fueling above a certain fueling rate is communicated between the vehicle and said controller.

17. The fuel delivery system of claim 10 wherein information relating to meeting spillage requirements is communicated between the vehicle and said controller.

18. The fuel delivery system of claim 10 wherein information relating to activating the dispenser earlier to minimize fueling time is communicated between the vehicle and said controller.

19. The fuel delivery system of claim 10 wherein information relating to billing for fuel purchased is communicated between the vehicle and said controller.

20. The fuel delivery system of claim 10 wherein information relating to charge/debit account information is communicated between the vehicle and said controller.

21. The fuel delivery system of claim 10 wherein information relating to personal identification numbers associated with a charge/debit account is communicated between the vehicle and said controller.

22. The fuel delivery system of claim 10 wherein information relating to identification of the vehicle operator is communicated between the vehicle and said controller.

23. The fuel delivery system of claim 10 wherein information relating to identification of the vehicle is communicated between the vehicle and said controller.

24. The fuel delivery system of claim 10 wherein information relating to merchandising to a vehicle operator is communicated between the vehicle and said controller.

25. The fuel delivery system of claim 10 wherein information relating to merchandising to a vehicle operator on an individual basis is communicated between the vehicle and said controller.

26. The fuel delivery system of claim 10 wherein information relating to merchandising to a vehicle operator by name is communicated between the vehicle and said controller.

27. The fuel delivery system of claim 10 wherein information relating to merchandising to a vehicle operator and their commercial history is communicated between the vehicle and said controller.

28. The fuel delivery system of claim 10 wherein information relating to vehicle diagnostics is communicated between the vehicle and said controller.

29. The fuel delivery system of claim 10 wherein information relating to vehicle identification is communicated from said system to a regulatory agency.

30. The fuel delivery system of claim 10 wherein information relating to owner information is communicated from said system to a regulatory agency.

31. The fuel delivery system of claim 10 wherein information relating to vehicle diagnostic information is communicated from said system to a regulatory agency..

32. The fuel delivery system of claim 10 wherein information from a regulatory agency is communicated through said system to the vehicle.

33. The fuel delivery system of claim 10 wherein information from a regulatory agency is communicated through said system to a vehicle operator.

34. The fuel delivery system of claim 10 wherein information relating to correcting a vehicle's environmental control system is communicated to the vehicle.

35. The fuel delivery system of claim 10 wherein said system determines if corrective action to previously identified environmental control problems have been corrected.

36. The fuel delivery system of claim 10 wherein information relating to vehicle maintenance is communicated between the vehicle and said system.

37. The fuel delivery system of claim 10 wherein information relating to vehicle maintenance history is communicated between the vehicle and said system.

38. The fuel delivery system of claim 10 wherein information relating to intelligent vehicle highway system functions is communicated between the vehicle and said system.

39. The fuel delivery system of claim 10 wherein information relating to maps is communicated between the vehicle and said system.

40. The fuel delivery system of claim 10 wherein information relating to navigation data is communicated between the vehicle and said system.

41. The fuel delivery system of claim 1 wherein said sensors are directionally sensitive and said controller is adapted to determine when the vehicle is at one of said multiple fueling positions by determining a direction and proximity of the vehicle to said dispenser.

42. The fuel delivery system of claim 1 wherein said fuel dispenser further includes a vapor recovery system controlled by said controller and adapted to retrieve fuel vapor expelled from a fuel tank of the vehicle, said controller adapted to determine the presence an on-board vapor recovery system on the vehicle based on the signal received from the transmitter, said controller controlling said vapor recovery system accordingly.

43. The fuel delivery system of claim 42 wherein said fuel dispenser includes dispenser electronics associated with each fueling position and said controller activates corresponding of said associated electronics once a vehicle is determined to be in a certain of said fueling positions and controls said vapor recovery system accordingly if the on-board vapor recovery system is present on the vehicle.

44. The fuel delivery system of claim 42 wherein said vapor recovery system is fully activated if an on-board vapor recovery system is not detected.

45. The fuel delivery system of claim 42 wherein said vapor recovery system is deactivated if the on-board vapor recovery system is detected.

46. The fuel delivery system of claim 42 wherein said vapor recovery system is modified if the on-board vapor recovery system is detected.

47. The fuel delivery system of claim 1 wherein said fuel dispenser includes
   a) at least two said fueling positions and
   b) an underground sensor associated with each said fueling position, each said sensor positioned so that the vehicle is above one said sensor when in one said fueling position, said controller adapted to monitor the signal from the transmitter at both said sensors to determine which said fueling position at which said vehicle is located.

48. A fuel delivery system capable of determining a vehicle's position relative to a unique fueling position comprising:
   a fuel dispenser having opposite sides and a fueling position at each of said opposite sides, each said fueling position adapted to fuel a vehicle when the vehicle reaches the fueling position;
   a controller operatively associated with said fuel dispenser; and
   communication means operatively associated with said controller and adapted to receive a signal emitted from the vehicle at locations corresponding to each said side of said dispenser;
   said controller adapted to determine a relative location of the vehicle to each said side of said dispenser by measuring a characteristic of the signal emitted from the vehicle and received at each said location corresponding to each side of said dispenser via said communication means.

49. The fuel delivery system of claim 1 wherein said controller measures the phase of the signal from the transmitter.

50. The fuel delivery system of claim 1 further comprising a plurality of dispensers wherein each said dispenser includes two said receivers, said controller adapted to multiplex the signal received at each said receiver to determine the vehicle location.

51. The fuel delivery system of claim 48 wherein said fuel dispenser further includes multiple fueling positions and a vapor recovery system controlled by said controller and adapted to retrieve fuel vapor expelled from a fuel tank of the vehicle, said controller adapted to determine the presence an on-board vapor recovery system on the vehicle based on the signal received from the transmitter, said controller controlling said vapor recovery system accordingly.

52. The fuel delivery system of claim 51 wherein said fuel dispenser includes dispenser electronics associated with each fueling position and said controller activates corresponding of said associated electronics once a vehicle is determined to be in a certain of said fueling positions and controls said vapor recovery system accordingly if the on-board vapor recovery system is present on the vehicle.

53. The fuel delivery system of claim 51 wherein said vapor recovery system is fully activated if an on-board vapor recovery system is not detected.

54. The fuel delivery system of claim 51 wherein said vapor recovery system is deactivated if the on-board vapor recovery system is detected.

55. The fuel delivery system of claim 51 wherein said vapor recovery system is modified if the on-board vapor recovery system is detected.

56. The fuel delivery system of claim 48 wherein said communication means are configured to receive a global positioning signal from a satellite to determine a vehicles location within a service station environment.

57. The fuel delivery system of claim 48 wherein information relating to the vehicle fuel type is communicated between the vehicle and said controller.

58. The fuel delivery system of claim 48 wherein information relating to certain available fueling options is communicated between the vehicle and said controller.

59. The fuel delivery system of claim 48 wherein information relating to identification of onboard recovery vapor recovery type vehicle is communicated between the vehicle and said controller as vehicle arrives at a fueling position.

60. The fuel delivery system of claim 48 wherein information relating to identification of onboard recovery vapor recovery type vehicle communicated between the vehicle and said controller at start of a fueling operation.

61. The fuel delivery system of claim 48 wherein information relating to restriction of unauthorized fueling of non-vehicular containers is communicated between the vehicle and said controller.

62. The fuel delivery system of claim 48 wherein information relating to fueling above a certain fueling rate is communicated between the vehicle and said controller.

63. The fuel delivery system of claim 48 wherein information relating to meeting spillage requirements is communicated between the vehicle and said controller.

64. The fuel delivery system of claim 48 wherein information relating to activating the dispenser earlier to minimize fueling time is communicated between the vehicle and said controller.

65. The fuel delivery system of claim 48 wherein information relating to billing for fuel purchased is communicated between the vehicle and said controller.

66. The fuel delivery system of claim 48 wherein information relating to charge/debit account information is communicated between the vehicle and said controller.

67. The fuel delivery system of claim 48 wherein information relating to personal identification numbers associated with a charge/debit account is communicated between the vehicle and said controller.

68. The fuel delivery system of claim 48 wherein information relating to identification of the vehicle operator is communicated between the vehicle and said controller.

69. The fuel delivery system of claim 48 wherein information relating to identification of the vehicle is communicated between the vehicle and said controller.

70. The fuel delivery system of claim 48 wherein information relating to merchandising to a vehicle operator is communicated between the vehicle and said controller.

71. The fuel delivery system of claim 48 wherein information relating to merchandising to a vehicle operator on an individual basis is communicated between the vehicle and said controller.

72. The fuel delivery system of claim 48 wherein information relating to merchandising to a vehicle operator by name is communicated between the vehicle and said controller.

73. The fuel delivery system of claim 48 wherein information relating to merchandising to a vehicle operator and their commercial history is communicated between the vehicle and said controller.

74. The fuel delivery system of claim 48 wherein information relating to vehicle diagnostics is communicated between the vehicle and said controller.

75. The fuel delivery system of claim 48 wherein information relating to vehicle identification is communicated from said system to a regulatory agency.

76. The fuel delivery system of claim 48 wherein information relating to owner information is communicated from said system to a regulatory agency.

77. The fuel delivery system of claim 48 wherein information relating to vehicle diagnostic information is communicated from said system to a regulatory agency.

78. The fuel delivery system of claim 48 wherein information from a regulatory agency is communicated through said system to the vehicle.

79. The fuel delivery system of claim 48 wherein information from a regulatory agency is communicated through said system to a vehicle operator.

80. The fuel delivery system of claim 48 wherein information relating to correcting a vehicle's environmental control system is communicated to the vehicle.

81. The fuel delivery system of claim 48 wherein said system determines if corrective action to previously identified environmental control problems have been corrected.

82. The fuel delivery system of claim 48 wherein information relating to vehicle maintenance is communicated between the vehicle and said system.

83. The fuel delivery system of claim 48 wherein information relating to vehicle maintenance history is communicated between the vehicle and said system.

84. The fuel delivery system of claim 48 wherein information relating to intelligent vehicle highway system functions is communicated between the vehicle and said system.

85. The fuel delivery system of claim 48 wherein information relating to maps is communicated between the vehicle and said system.

86. The fuel delivery system of claim 48 wherein information relating to navigation data is communicated between the vehicle and said system.

87. A fuel dispenser capable of determining a vehicle's position relative to a unique fueling position comprising:
multiple fueling positions;
a controller;
a receiver operatively associated with said controller; and
at least one antenna operatively associated with said receiver to receive a signal emitted from a transmitter on the vehicle;
said controller adapted to determine a relative proximity of the vehicle to one said fueling position by measuring a characteristic of the signal emitted from the transmitter and received at said antenna.

88. A fuel delivery system capable of controlling a fuel dispenser's vapor recovers system based on the presence of an on-board vapor recovery system on a vehicle comprising:
a fuel dispenser having a vapor recovery system for retrieving fuel vapor expelled from a fuel tank of the vehicle;
a controller operatively associated with said fuel dispenser and adapted to control operation of the vapor recovery system;
a receiver operatively associated with said controller; and
an antenna operatively associated with said receiver to receive a signal emitted from a transmitter on the vehicle;
said controller adapted to determine the presence of the on-board vapor recovery system of the vehicle upon receiving the signal emitted from the transmitter and control the vapor recovery system accordingly,
wherein said controller is adapted to determine a relative proximity of the vehicle to a fueling position of said dispenser by measuring a characteristic of the signal emitted from the transmitter received at said receiver.

89. A fuel delivery system capable of controlling a fuel dispenser's vapor recovery system based on the presence of an on-board vapor recovery system on a vehicle comprising:
a fuel dispenser having a vapor recovery system for retrieving fuel vapor expelled from a fuel tank of the vehicle;
a controller operatively associated with said fuel dispenser and adapted to control operation of the vapor recovery system;
a receiver operatively associated with said controller; and
an antenna operatively associated with said receiver to receive a signal emitted from a transmitter on the vehicle;
said controller adapted to determine the presence of the on-board vapor recovery system of the vehicle upon receiving the signal emitted from the transmitter and control the vapor recovery system accordingly,
wherein said controller is adapted to determine a relative location of the vehicle to a fueling position of said dispenser by measuring a characteristic of the signal emitted from the transmitter received at two or more of said receivers.

90. A fuel delivery system capable of determining the presence of a vehicle relative to a unique fueling position and controlling a fuel dispenser's vapor recovery system based on the presence of an on-board vapor recovery system on a vehicle comprising:
a fuel dispenser having multiple fueling positions and a vapor recovery system for retrieving fuel vapor expelled from a fuel tank of the vehicle;
a controller operatively associated with said fuel dispenser and adapted to control operation of the vapor recovery system;
a receiver operatively associated with said controller; and
at least two antennas operatively associated with said receiver to receive a signal emitted from a transmitter on the vehicle;
said controller adapted to determine:
a) the location of a vehicle relative to one said fueling position by measuring a characteristic of the signal received at each said antenna and
b) the presence of the on-board vapor recovery system of the vehicle upon receiving the signal emitted from the transmitter and control the vapor recovery system accordingly.

91. The fuel delivery system of claim 90 wherein said fuel dispenser further includes a vapor recovery system controlled by said controller and adapted to retrieve fuel vapor expelled from a fuel tank of the vehicle, said controller adapted to determine the presence an on-board vapor recovery system on the vehicle based on the signal received from the transmitter, said controller controlling said vapor recovery system accordingly.

92. The fuel delivery system of claim 91 wherein said fuel dispenser includes dispenser electronics associated with each fueling position and said controller activates corresponding of said associated electronics once a vehicle is determined to be in a certain of said fueling positions and controls said vapor recovery system accordingly if the on-board vapor recovery system is present on the vehicle.

93. The fuel delivery system of claim 91 wherein said vapor recovery system is fully activated if an on-board vapor recovery system is not detected.

94. The fuel delivery system of claim 91 wherein said vapor recovery system is deactivated if the on-board vapor recovery system is detected.

95. The fuel delivery system of claim 91 wherein said vapor recovery system is modified if the on-board vapor recovery system is detected.

96. A fuel delivery system as claimed in claim 91 wherein said controller is configured to adjust said vapor recovery system according to the signal emitted from the transmitter.

97. A fuel delivery system as claimed in claim 91 wherein said controller is configured to turn off said vapor recovery system when the signal emitted from the transmitter indicates the presence of a vehicle vapor recovery system on the vehicle.

98. A fuel delivery system as claimed in claim 97 wherein said vapor recovery system resumes substantial vapor recovery if the signal emitted from the transmitter indicates a malfunction of the vapor recovery system of the vehicle.

99. A fuel delivery system as claimed in claim 91 wherein said vapor recovery system is adjusted by said controller in a manner to assist vapor recovery during the fueling operation upon the determination of the presence of a vehicle vapor recovery system on the vehicle, whereby the respective vapor recovery systems operate in conjunction to maximize fuel vapor recovery.

100. A fuel delivery system as claimed in claim 91 wherein said controller is adapted to direct air flow in the vapor recovery path to atmosphere upon detection of a vehicle having a vapor recovery system.

101. A fuel delivery system as claimed in claim 91 wherein said controller is adapted to deactivate the vapor recovery system of the fuel dispenser upon detection of a vehicle having a vapor recovery system.

102. A fuel delivery system as claimed in claim 91 wherein said controller is adapted to adjust said vapor recovery system to pull in an amount of air or hydrocarbon vapor mixture to reduce breathing losses.

103. A fuel delivery system as claimed in claim 91 wherein said receiver and sensor are adapted to receive an electromagnetic signal from the transmitter.

104. A fuel delivery system as claimed in claim 91 wherein said receiver and sensor are adapted to receive an acoustic signal from the transmitter.

105. A fuel delivery system as claimed in claim 91 wherein said receiver and sensor are adapted to receive an infrared signal from the transmitter.

106. A fuel delivery system as claimed in claim 91 wherein said receiver and sensor are adapted to receive an optic signal from the transmitter.

* * * * *